(12) United States Patent
Hamamoto et al.

(10) Patent No.: US 9,325,149 B2
(45) Date of Patent: Apr. 26, 2016

(54) MULTI-BEAM COMBINING APPARATUS

(71) Applicants: MITSUBISHI HEAVY INDUSTRIES, LTD., Tokyo (JP); Institute for Laser Technology, Osaka (JP); OSAKA UNIVERSITY, Osaka (JP)

(72) Inventors: Koichi Hamamoto, Tokyo (JP); Takahiro Yamada, Tokyo (JP); Haik Chosrowjan, Osaka (JP); Hiroaki Furuse, Osaka (JP); Masayuki Fujita, Osaka (JP); Yasukazu Izawa, Osaka (JP); Junji Kawanaka, Osaka (JP); Noriaki Miyanaga, Osaka (JP)

(73) Assignees: Mitsubishi Heavy Industries, Ltd., Tokyo (JP); Institute for Laser Technology, Osaka (JP); Osaka University, Osaka (JP)

( * ) Notice: Subject to any disclaimer, the term of this patent is extended or adjusted under 35 U.S.C. 154(b) by 0 days.

(21) Appl. No.: 14/368,559

(22) PCT Filed: Jan. 17, 2013

(86) PCT No.: PCT/JP2013/050837
§ 371 (c)(1),
(2) Date: Jun. 25, 2014

(87) PCT Pub. No.: WO2013/108850
PCT Pub. Date: Jul. 25, 2013

(65) Prior Publication Data
US 2015/0138618 A1    May 21, 2015

(30) Foreign Application Priority Data
Jan. 20, 2012  (JP) .................................. 2012-009972

(51) Int. Cl.
*G02B 26/00*  (2006.01)
*H01S 3/10*  (2006.01)
(Continued)

(52) U.S. Cl.
CPC .............. *H01S 3/10053* (2013.01); *G01J 9/02* (2013.01); *G02B 26/06* (2013.01);
(Continued)

(58) Field of Classification Search
CPC .................................................... G02F 1/0123
USPC .......................................................... 359/239
See application file for complete search history.

(56) References Cited

U.S. PATENT DOCUMENTS

| 6,219,360 | B1 | 4/2001 | Komine |
| 7,884,997 | B2 | 2/2011 | Goodno |

(Continued)

FOREIGN PATENT DOCUMENTS

| CA | 2 278 071 | 2/2000 |
| CN | 102012561 | 4/2011 |

(Continued)

OTHER PUBLICATIONS

International Preliminary Report on Patentability and Written Opinion of the International Searching Authority issued Jul. 22, 2014 in International (PCT) Application No. PCT/JP2013/050837.

(Continued)

*Primary Examiner* — James Jones
(74) *Attorney, Agent, or Firm* — Wenderoth, Lind & Ponack, L.L.P.

(57) ABSTRACT

A multi-beam combining apparatus includes a phase shifting section, a superposing section, an observing section and a phase control section. The phase shifting section generates a plurality of phase-shifted laser beams by shifting the phase of each of the plurality of laser beams. The superposing section generates a plurality of superposed laser beam by superposing the reference laser beam and each of the plurality of phase-shifted laser beams. The observing section generates interference pattern data of a spatial interference pattern which appears when observing each of the superposed laser beams. The phase control section carries out a feedback control of the phase shifts in the phase shifting section based on the interference pattern data obtained for every superposed laser beam, and thereby sets the plurality of phase-shifted laser beams to desired states.

7 Claims, 10 Drawing Sheets

(51) Int. Cl.
*G01J 9/02* (2006.01)
*G02B 26/06* (2006.01)
*G02B 27/09* (2006.01)
*H01S 3/13* (2006.01)
*H01S 3/23* (2006.01)
*G02F 1/01* (2006.01)
*G02F 1/21* (2006.01)
*H01S 3/00* (2006.01)

(52) U.S. Cl.
CPC ......... *G02B 27/0905* (2013.01); *G02F 1/0121* (2013.01); *G02F 1/21* (2013.01); *H01S 3/0085* (2013.01); *H01S 3/1307* (2013.01); *H01S 3/2308* (2013.01); *H01S 3/2383* (2013.01)

(56) References Cited

U.S. PATENT DOCUMENTS

| | | | |
|---|---|---|---|
| 2001/0002915 A1 | 6/2001 | Komine | |
| 2005/0201429 A1 | 9/2005 | Rice et al. | |
| 2008/0031292 A1* | 2/2008 | Suzuki et al. | 372/29.016 |
| 2009/0134310 A1 | 5/2009 | Goodno | |
| 2011/0032602 A1 | 2/2011 | Rothenberg | |
| 2011/0032603 A1 | 2/2011 | Rothenberg | |

FOREIGN PATENT DOCUMENTS

| | | |
|---|---|---|
| EP | 0 952 642 | 10/1999 |
| EP | 0 980 123 | 2/2000 |
| EP | 1 793 460 | 6/2007 |
| JP | 2000-56280 | 2/2000 |
| JP | 2005-294409 | 10/2005 |
| WO | 2006/030482 | 3/2006 |

OTHER PUBLICATIONS

International Search Report issued Apr. 23, 2013 in International (PCT) Application No. PCT/JP2013/050837.

H. Chosrowjan, "Atarashii Coherent Beam Ketsugo Gijutsu", Laser Cross, May 25, 2012, No. 290, pp. 1-3 with concise explanation.

H. Chosrowjan et al., "A Novel Concept of Coherent Beam Combining (CBC) Technique for Applications in High Power Multichannel Laser Amplifier Systems", Proceeding of 59th Meeting of the Japan Society of Applied Physics and Related Societies, Mar. 15, 2012, p. 4-116, 17a-E9-5, cited in ISR.

Extended European Search Report dated Aug. 26, 2015 issued in corresponding European Patent Application No. 13738607.4.

Russian Office Action dated Aug. 11, 2015 issued in corresponding Russian Patent Application No. 2014128306 (with English translation).

Chinese Office Action dated Nov. 13, 2015 issued in corresponding Chinese Patent Application No. 201380005287.0. (with English translation).

Russian Decision on Patent Grant dated Dec. 16, 2015 issued in corresponding Russian Application No. 2014128306. (partial English translation).

* cited by examiner

MULTI-BEAM COMBINING APPARATUS

TECHNICAL FIELD

The present invention is related to a multi-beam combining apparatus.

BACKGROUND ART

A coherent beam combining apparatus which obtains a high intensity laser output by combining a plurality of laser beams is disclosed in Patent Literature 1 (U.S. Pat. No. 7,884, 997B2) and Patent Literature 2 (JP 2005-294409A).

In Patent Literature 1, "a heterodyne method" is adopted to detect a phase difference among a plurality of laser beams. Specifically, a master laser beam outputted from a master oscillator is divided into a reference laser beam and a plurality of laser beams. The frequency of the reference laser beam is shifted by an optical frequency shifter. By superposing the reference laser beam after the frequency shift and each of the plurality of laser beams, a beat is generated. Based on the observation of the beat, the phase difference among the plurality of laser beams is determined.

CITATION LIST

[Patent Literature 1] U.S. Pat. No. 7,884,997B2
[Patent Literature 2] JP 2005-294409A

SUMMARY OF THE INVENTION

In case of the light heterodyne method, because the reference laser beam and the laser beam need to be different from each other in the frequency, the frequency shifter is indispensable, as mentioned above. However, this causes complication of an apparatus and a high manufacturing cost thereof One object of the present invention is to realize a multi-beam combining apparatus which can control the phase of each of a plurality of laser beams in a simple configuration.

In one aspect of the present invention, a multi-beam combining apparatus is provided. The multi-beam combining apparatus includes a phase shifting section, a superposing section, an observing section and a phase control section. The phase shifting section generates a plurality of phase-shifted laser beams by shifting the phase of each of the plurality of laser beams. The superposing section generates a plurality of superposed laser beams by superposing each of the plurality of phase-shifted laser beams and a reference laser beam. The observing section generates interference pattern data of a spatial interference pattern which appears when the observing section observes each of the plurality of superposed laser beams. The phase control section carries out a feedback control of a phase shift by the phase shifting section based on the interference pattern data obtained from the plurality of superposed laser beams, and thereby sets the plurality of phase-shifted laser beams to desired states.

The observing section may include a plurality of observing units disposed to observe the plurality of superposed laser beams. Also, each of the plurality of observing units may include a plurality of sensors which observe the intensities of the corresponding superposed laser beams at a plurality of observation positions. In this case, each of the interference pattern data contains the intensities observed in the plurality of observation positions.

An interference pattern parameter is defined based on the intensity observed in each of the plurality of observation positions. In this case, the phase control section may carry out the feedback control of the phase shift by the phase shifting section such that the interference pattern parameter of each of the plurality of superposed laser beams coincides with a target value.

The number of sensors may be two. The two sensors observe intensities in the two observation positions, respectively. In this case, the interference pattern parameter depends on a ratio of the intensities in the two observation positions, an inclination between the intensities or a difference of them.

The phase control section may carry out the feedback control of the phase shift by the phase shifting section such that the intensities in the two observation positions become equal to each other or become a target value.

Moreover, the multi-beam combining apparatus according to the present invention may include a beam amplifying section which amplifies each of the plurality of phase-shifted laser beams.

Moreover, the multi-beam combining apparatus according to the present invention may further include a laser oscillator which generates a master laser beam, and a beam splitting section which splits the master laser beam into the plurality of laser beams and the reference laser beam.

In the multi-beam combining apparatus according to the present invention, the reference laser beam generated by the beam splitting section may reach the superposing section without passing through a frequency shifter.

According to the present invention, the multi-beam combining apparatus which can control the phase of each of the plurality of laser beams can be realized in a simple configuration.

DESCRIPTION OF EMBODIMENTS

Hereinafter, embodiments of the present invention will be described with reference to the attached drawings.

Figure 1:
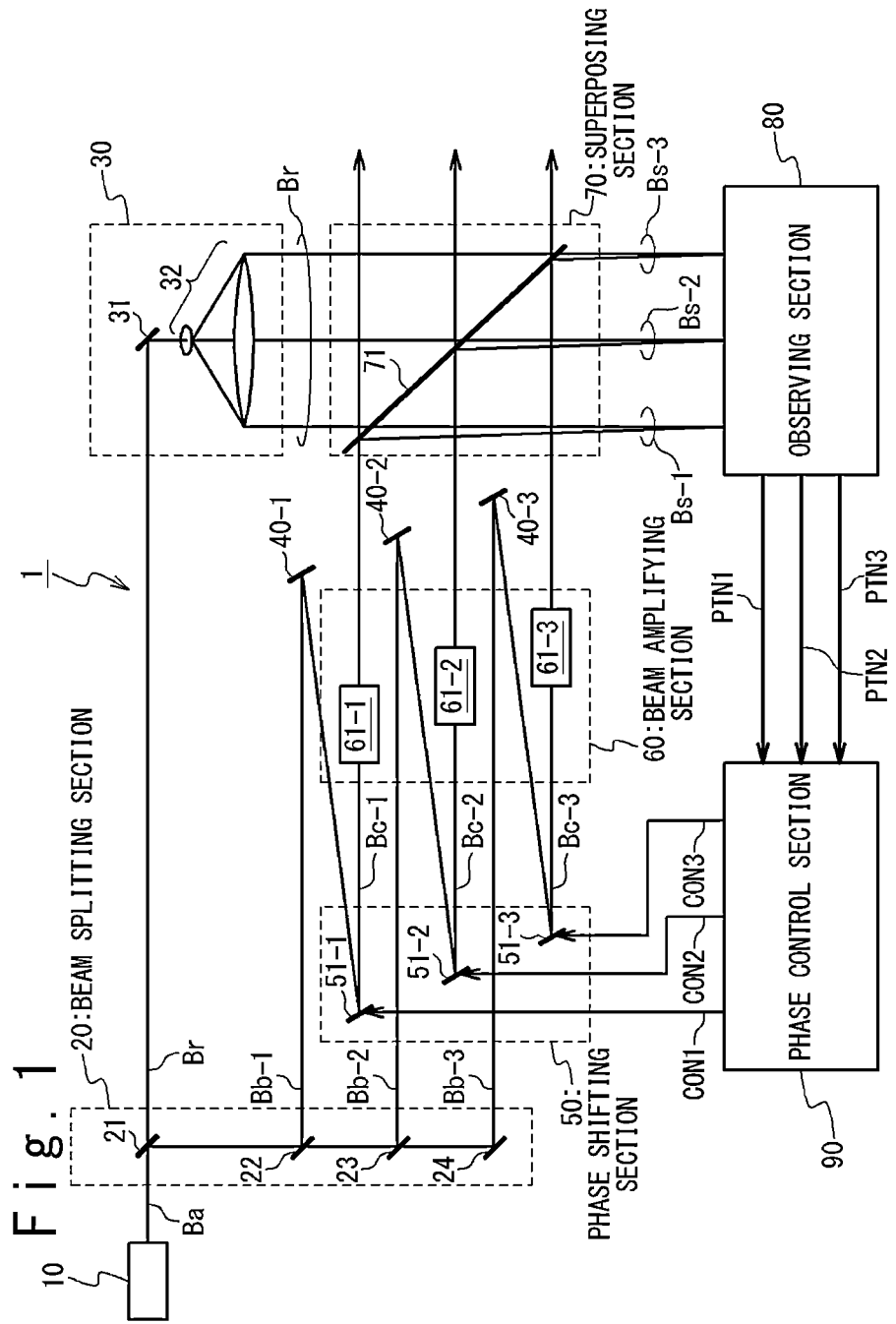
FIG. 1 is a block diagram showing a configuration example of a multi-beam combining apparatus according to an embodiment of the present invention.

FIG. 1 is a block diagram showing a configuration example of a multi-beam combining apparatus 1 according to an embodiment of the present invention. The multi-beam combining apparatus 1 contains a laser oscillator 10, a beam splitting section 20, a beam expanding section 30, a phase shifting section 50, a beam amplifying section 60, a superposing section 70, an observing section 80 and a phase control section 90.

The laser oscillator 10 functions as a master oscillator to generate and outputs a master laser beam Ba.

The beam splitting section 20 receives the master laser beam Ba from the laser oscillator 10 and splits the master laser beam Ba into a reference laser beam Br and a plurality of target laser beams Bb. For example, as shown in FIG. 1, the beam splitting section 20 includes beam splitters 21, 22 and 23 and a mirror 24. The beam splitter 21 splits the master laser beam Ba into two laser beams: one is a reference laser beam Br and the other laser beam is incident to the beam splitter 22. The beam splitter 22 splits the laser beam received from the beam splitter 21 into two laser beams: one is a target laser beam Bb-1 and the other is incident to the beam splitter 23. The beam splitter 23 splits the laser beam received from the beam splitter 23 into two laser beams: one is a target laser beam Bb-2 and the other is incident to the mirror 24. The laser beam reflected by the mirror 24 is a target laser beam Bb-3. Note that three target laser beams Bb-1 to Bb-3 are generated from the master laser beam in this example, but the number of laser beams is not limited to "3". Also, an optical fiber may be used for the splitting of the beam.

The beam expanding section 30 receives the reference laser beam Br outputted from the beam splitting section 20 and expands a beam size of the reference laser beam Br. In detail, the beam expanding section 30 includes a mirror 31 and a beam expander 32. The reference laser beam Br is reflected by the mirror 31 and is incident on the beam expander 32. The beam expander 32 expands the beam size of the reference laser beam Br. The reference laser beam Br after the beam size expansion is supplied to the following superposing section 70 (a beam splitter 71). It is desirable that the reference laser beam Br after the beam size expansion is a plane wave.

As an example, the target laser beams Bb-1, Bb-2 and Bb-3 outputted from the beam splitting section 20 are reflected by mirrors 40-1, 40-2 and 40-3, and are incident on the phase shifting section 50, respectively. As another example, the target laser beams Bb-1, Bb-2 and Bb-3 are incident on the phase shifting section 50 by use of optical fibers. Also, a beam expander, pointing correction optics, wavefront correction optics and so on may be contained between the phase shifting sections 50 and the beam splitting section 20.

The phase shifting section 50 receives the plurality of target laser beams Bb-1 to Bb-3. The phase shifting section 50 can shift the phase of each of the target laser beams Bb-1 to Bb-3. For example, as shown in FIG. 1, the phase shifting section 50 includes phase shifters 51-1 to 51-3. For example, as each phase shifter 51, a piezo mirror (piezo-actuator mirror system) is used. As another example, a transmissive-type phase shifter may be used. The phase shifters 51-1, 51-2 and 51-3 are arranged to receive the target laser beams Bb-1, Bb-2 and Bb-3 and to shift the phases of the target laser beams Bb-1, Bb-2 and Bb-3, respectively. It is possible to control each of phase shift amounts of the phase shifters 51-1, 51-2 and 51-3 in response to control signals CON 1, CON 2 and CON 3. After the phase shift, the target laser beams Bb-1, Bb-2 and Bb-3 become phase-shifted laser beams Bc-1, Bc-2 and Bc-3, respectively. In other words, the phase shifting section 50 generates the phase-shifted laser beams Bc-1, Bc-2 and Bc-3 by performing the phase shift to each of the target laser beams Bb-1, Bb-2 and Bb-3. It is possible to control the phase shift by the phase shifting section 50 through the control signals CON1 to CON3. Note that those control signals CON1 to CON3 are generated by the following phase control section 90.

The beam amplifying section 60 receives the phase-shifted laser beams Bc-1 to Bc-3 outputted from the phase shifting section 50 and amplifies each of those phase-shifted laser beams Bc-1 to Bc-3. For example, as shown in FIG. 1, the beam amplifying section 60 includes amplifiers (power amplifiers) 61-1, 61-2 and 61-3. The amplifiers 61-1, 61-2 and 61-3 amplify the phase-shifted laser beams Bc-1, Bc-2 and Bc-3, respectively. The phase-shifted laser beams Bc-1, Bc-2 and Bc-3 after the amplification are supplied to the following superposing section 70 (the beam splitter 71). Note that a beam expander, pointing correction optics, wavefront correction optics and so on may be contained in the beam amplifying section 60.

The superposing section 70 receives the reference laser beam Br outputted from the beam expanding section 30 and also receives the plurality of phase-shifted laser beams Bc-1, Bc-2 and Bc-3 outputted from the beam amplifying section 60. Then, the superposing section 70 generates a plurality of superposed laser beams Bs-1, Bs-2 and Bs-3 by superposing each of the plurality of phase-shifted laser beams Bc-1, Bc-2 and Bc-3 and the reference laser beam Br. For example, as shown in FIG. 1, the superposing section 70 includes the beam splitter 71. The beam splitter 71 divides or splits each of the phase-shifted laser beams Bc-1, Bc-2 and Bc-3. The directions of the phase-shifted laser beams Bc-1, Bc-2 and Bc-3 after the splitting and the reference laser beam Br are coincident with each other, and they are superposed to generate the superposed laser beams Bs-1, Bs-2 and Bs-3.

Note that in this embodiment, any frequency shifter (optical frequency shifter) is not disposed onto an optical route between the beam splitting section 20 and the superposing section 70. The reference laser beam Br generated by the beam splitting section 20 reaches the superposing section 70 without passing through any frequency shifter. Also, the target laser beams Bb-1 to Bb-3 and the phase-shifted laser beams Bc-1 to Bc-3 do not pass through any frequency shifters. Therefore, the frequencies of each of the reference laser beam Br and the phase-shifted laser beams Bc-1 to Bc-3 is substantially coincident with each other.

Figure 2:
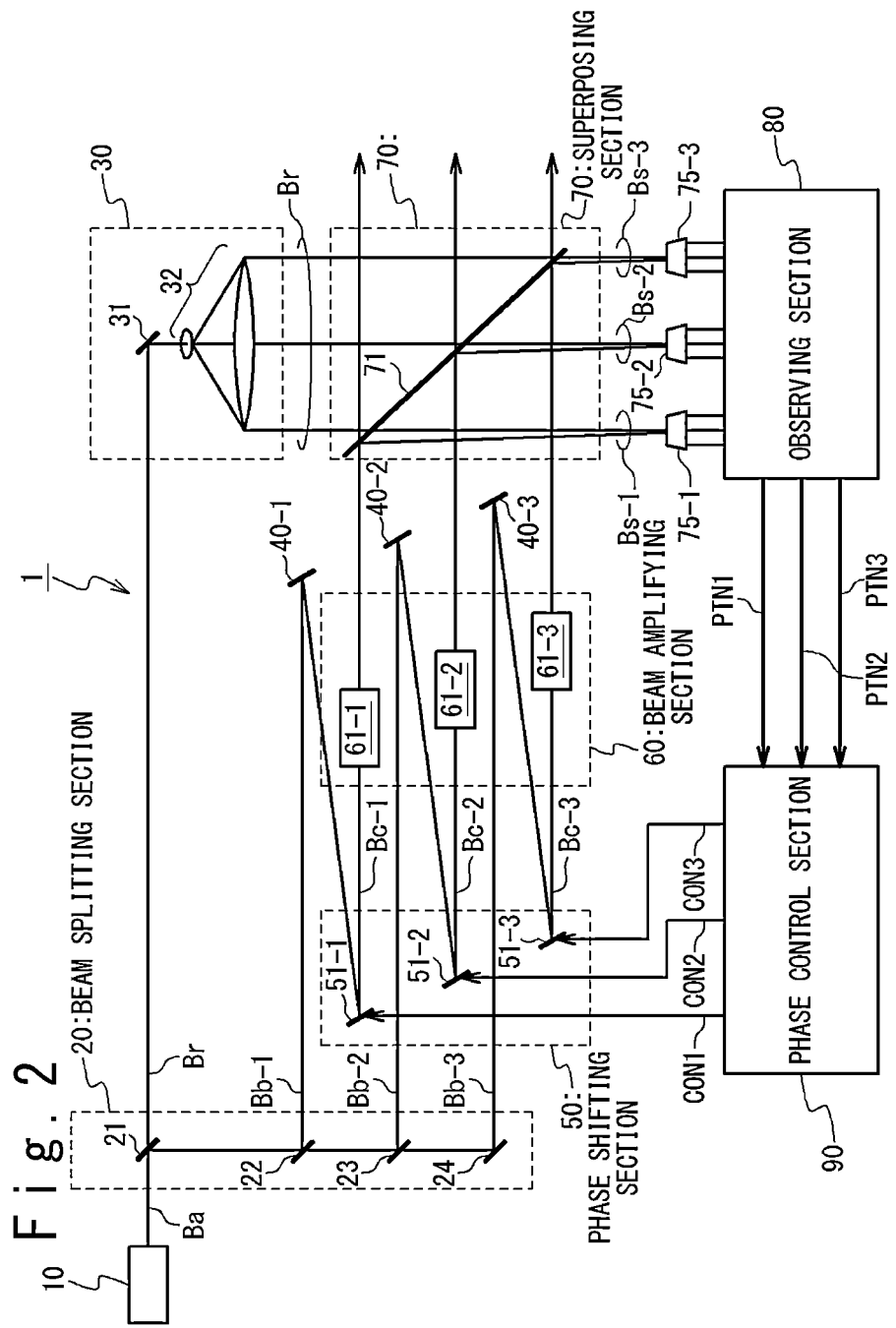
FIG. 2 is a block diagram showing another configuration example of the multi-beam combining apparatus according to the embodiment of the present invention.

The plurality of superposed laser beams Bs-1 to Bs-3 are supplied to the observing section 80. As shown in FIG. 2, beam expanders 75-1, 75-2 and 75-3 may be provided between the superposing section 70 and the observing section 80. The beam expanders 75-1, 75-2 and 75-3 expand the beam sizes of the superposed laser beams Bs-1, Bs-2 and Bs-3, respectively. In this case, the superposed laser beams Bs-1 to Bs-3 after the beam size expansion are supplied to the observing section 80.

The observing section 80 observes each of the superposed laser beams Bs-1 to Bs-3. An observation plane is parallel to the wavefront of the reference laser beam Br which is a plane wave.

Figure 3:
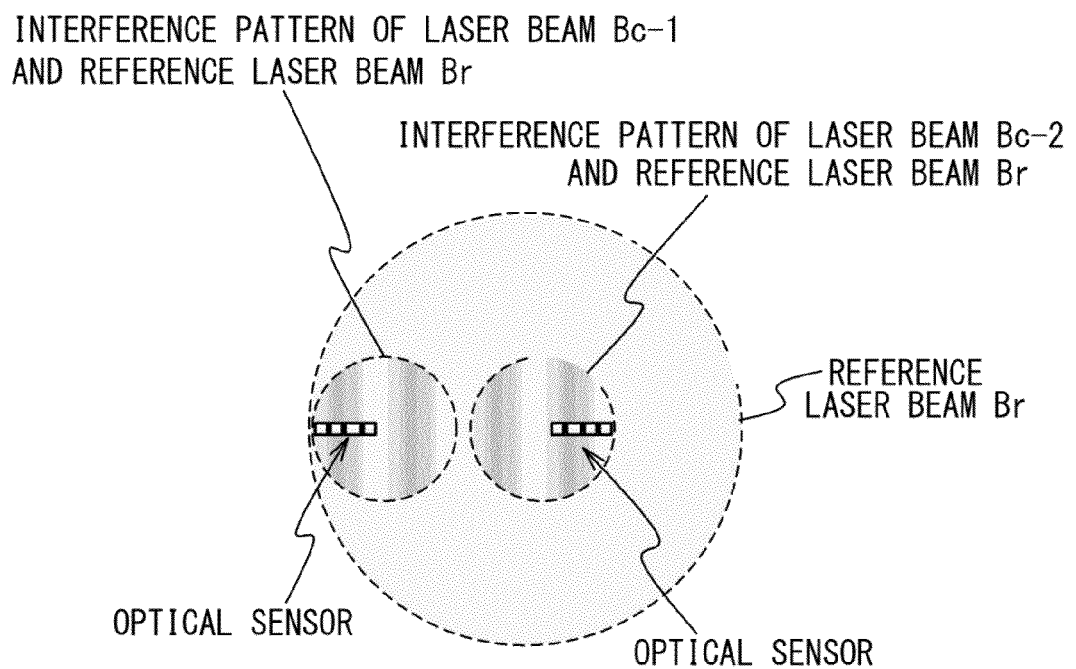
FIG. 3 is a diagram schematically showing superposition of a reference laser beam and a laser beam.
Figure 4:
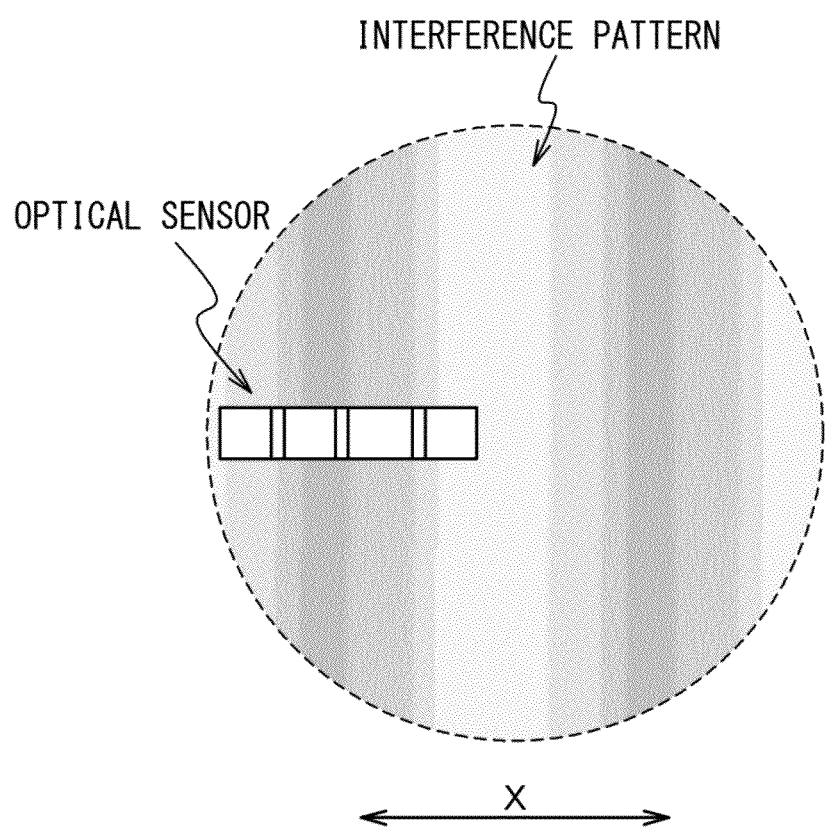
FIG. 4 is a diagram schematically showing an interference pattern when observing a superposed laser beam.

Here, the interference of the reference laser beam Br and the phase-shifted laser beam are considered. FIG. 3 shows the superposition of the reference laser beam Br and the phase-shifted laser beam Bc. FIG. 4 shows an example of a beam spot of the superposed laser beam Bs-i (i=1, 2, 3) in the observation plane. In the beam spot, the phase of the reference laser beam Br is uniform but the phase of the phase-shifted laser beam Bc-i is not always uniform. Therefore, when observing the superposed laser beam Bs-i as the result of the superposition of the phase-shifted laser beam Bc-i and the reference laser beam Br, a "spatial interference pattern (interference fringe)" appears due to the interference as shown in FIG. 4. A repetition direction of the interference fringe (a direction of contrast of intensity) is hereinafter referred to as "a direction of X".

Figure 5:
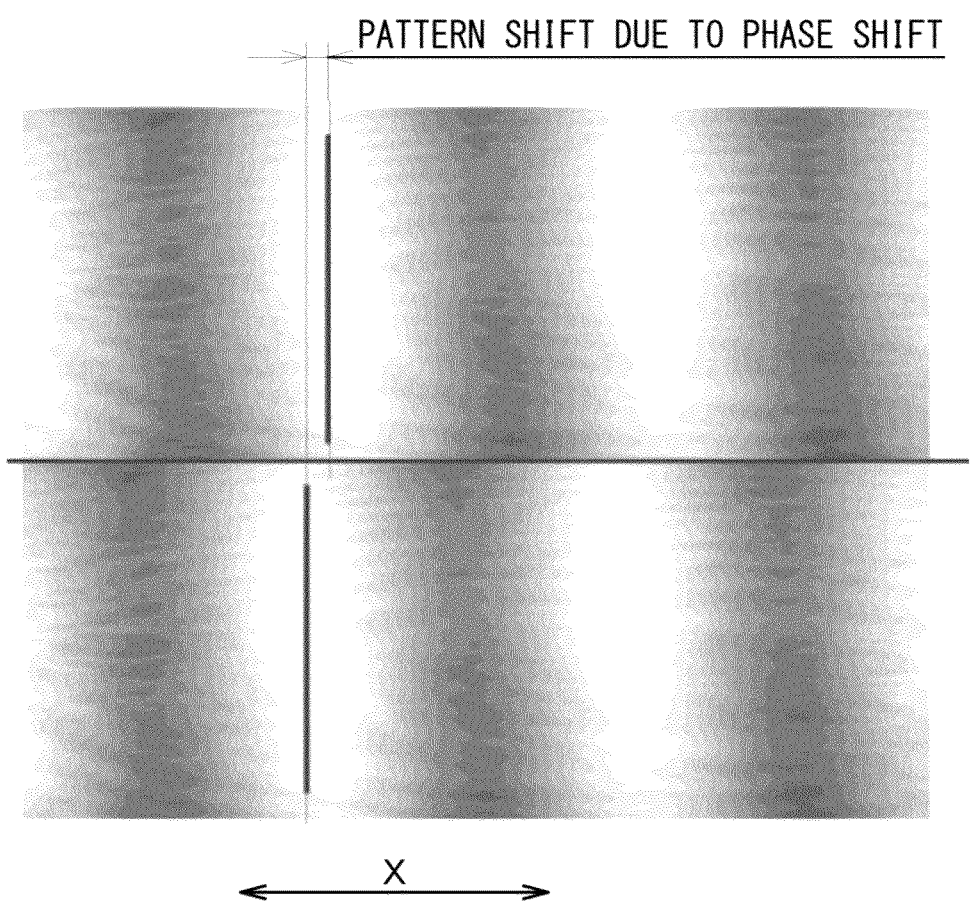
FIG. 5 is a diagram showing a shift of the interference pattern upon a change of the phase.

FIG. 5 shows a shift of the interference pattern due to a change of phase. When the phase of the phase-shifted laser beam Bc-i changes, the interference pattern on the observation plane shifts to the direction of X according to the change. In other words, the interference pattern on the observation plane can be shifted to the direction of X by changing the phase of the phase-shifted laser beam Bc-i by controlling the phase shift by the above-mentioned phase shifting section 50.

Figure 6:
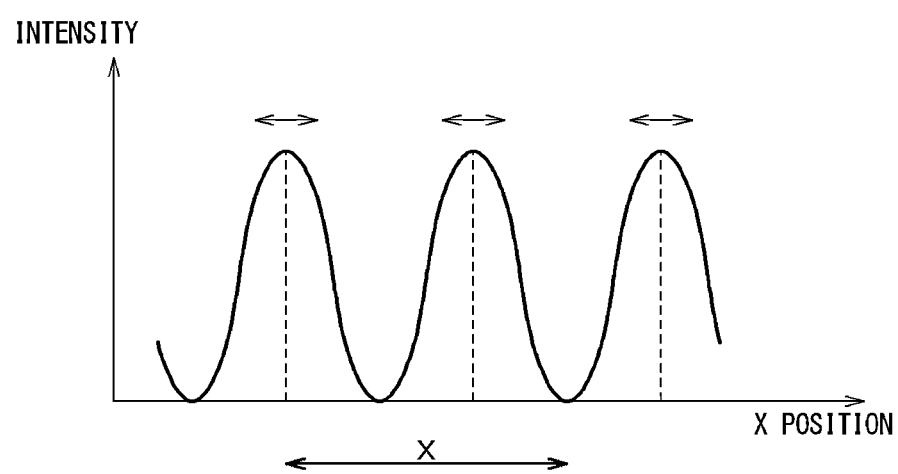
FIG. 6 is a diagram showing an intensity distribution of the superposed laser beam in an X direction.

FIG. 6 shows an intensity distribution on the observation plane of the superposed laser beam Bs-i into the X direction. The horizontal axis shows a position in the X direction and the vertical axis shows a laser intensity. As shown in FIG. 6, a fluctuation of intensity of the laser beam due to the interference appears repeatedly in the X direction. Specifically, the laser intensity becomes maximum at the X position where the phase-shifted laser beam Bc-i and the reference laser beam Br are in-phase, and the laser intensity is minimum at the X position where the phase-shifted laser beam Bc-i and the reference laser beam Br are in a reverse-phase. In this way, a spatial intensity distribution corresponding to the interference pattern (the interference fringe) is observed. When the phase of the phase-shifted laser beam Bc-i is changed, the intensity distribution on the observation plane shifts to the X direction according to the phase change. The intensity distribution on the observation plane can be shifted in the X direction, by changing the phase of the phase-shifted laser beam Bc-i through control of the phase shift by the above-mentioned phase shifting section 50.

The observing section 80 generates "interference pattern data PTNi" of the spatial interference pattern of the the superposed laser beam Bs-i through the observation of the superposed laser beam Bs-i. Any information which includes the interference pattern may be the interference pattern data PTNi. For example, the 2-dimensional image data as shown in FIG. 4 and FIG. 5, or may be intensity distribution data to the X direction as shown with FIG. 6. Note that the interference pattern data PTNi is separately obtained for every superposed laser beam Bs-i (i=1, 2, 3). In other words, the observing section 80 generates the interference pattern data PTN1, PTN2 and PTN3 separately by observing each of the superposed laser beams Bs-1, Bs-2 and Bs-3. The observing section 80 outputs their interference pattern data PTN1, PTN2 and PTN3 to the phase control section 90.

The phase control section 90 receives the interference pattern data PTN1 to PTN3. By referring to the interference pattern data PTN1 to PTN3, the phase control section 90 can get the phase relation information between the plurality of phase-shifted laser beams Bc-1 to Bc-3. The phase control section 90 can carry out a feedback-control to each of the phase shifters 51-1 to 51-3 in the phase shifting section 50 such that a desired phase relation is obtained. Specifically, the phase control section 90 generates control signals CON1, CON2 and CON3 so that each of the phase-shifted laser beams Bc-1, Bc-2 and Bc-3 is set to a desired state, and outputs those control signals CON1, CON2 and CON3 to each of the phase shifters 51-1, 51-2 and 51-3. In this way, the phase control section 90 carries out the feedback control for the phase shift by the phase shifting section 50 based on the interference pattern data PTN1, PTN2 and PTN3 obtained from the superposed laser beams Bs-1, Bs-2 and Bs-3, and thus, the plurality of phase-shifted laser beams Bc-1, Bc-2 and Bc-3 are set to the desired states.

Typically, the phase control section 90 carries out pattern matching based on the interference pattern data PTN1 to PTN3 so that the phases of the phase-shifted laser beams Bc-1 to Bc-3 are coincident with each other. By combining the plurality of phase-shifted laser beams Bc-1 to Bc-3 which are in-phase, a high intensity laser output can be obtained.

Hereinafter, a configuration example of the observing section 80 and the phase control section 90 will be described.

Figure 7:
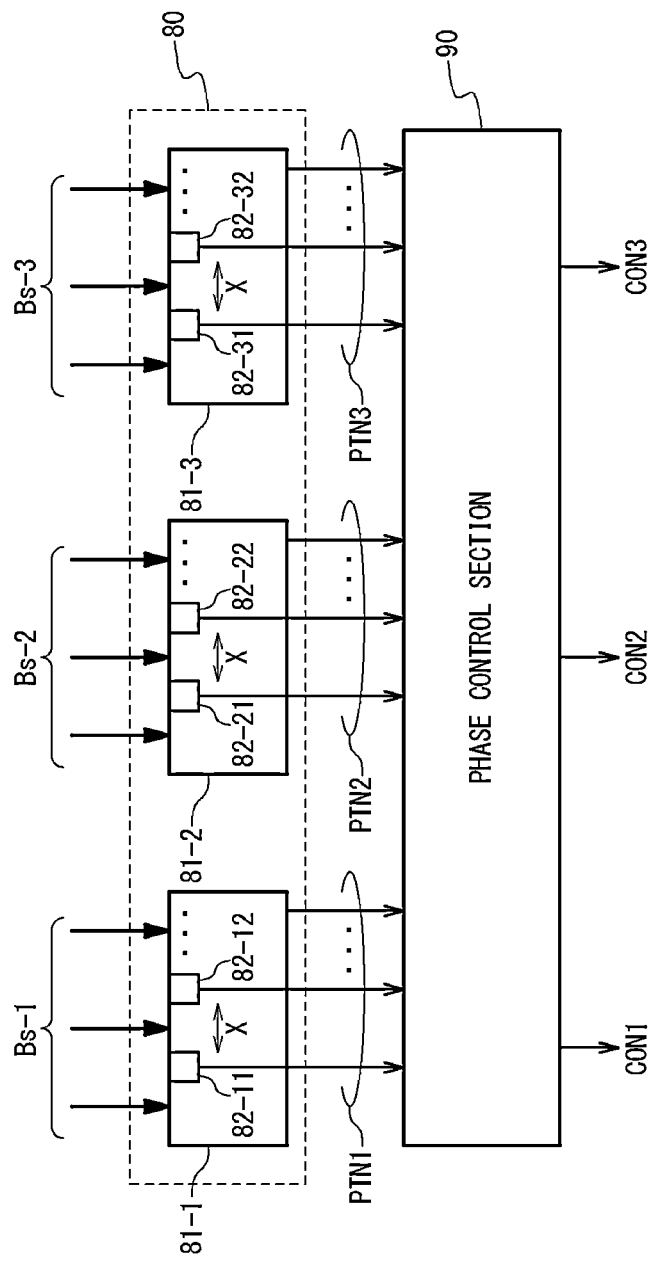
FIG. 7 is a block diagram showing a configuration example of an observing section according to the embodiment of the present invention.

As shown in FIG. 7, the observing section 80 includes observing units 81-1, 81-2 and 81-3. The observing units 81-1, 81-2 and 81-3 are separately installed to observe the superposed laser beams Bs-1, Bs-2 and Bs-3 separately. The observing units 81-1, 81-2 and 81-3 generate the interference pattern data PTN1, PTN2 and PTN3, respectively.

Each observing unit 81-i (i=1, 2, 3) observes the intensity of the corresponding superposed laser beam Bs-i at a plurality of observation positions. For this purpose, the observing unit 81-i includes a plurality of sensors 82-ij (j=1 to n; n is an integer equal to or more than two). For example, a photodiode is used as the sensor 82-ij. The plurality of sensors 82-ij are arranged in X positions which are different from each other and stands along the X direction. By using such a plurality of sensors 82-ij, the observing unit 81-i becomes possible to measure the intensity of the superposed laser beam Bs-i in the different X positions.

Figure 8:
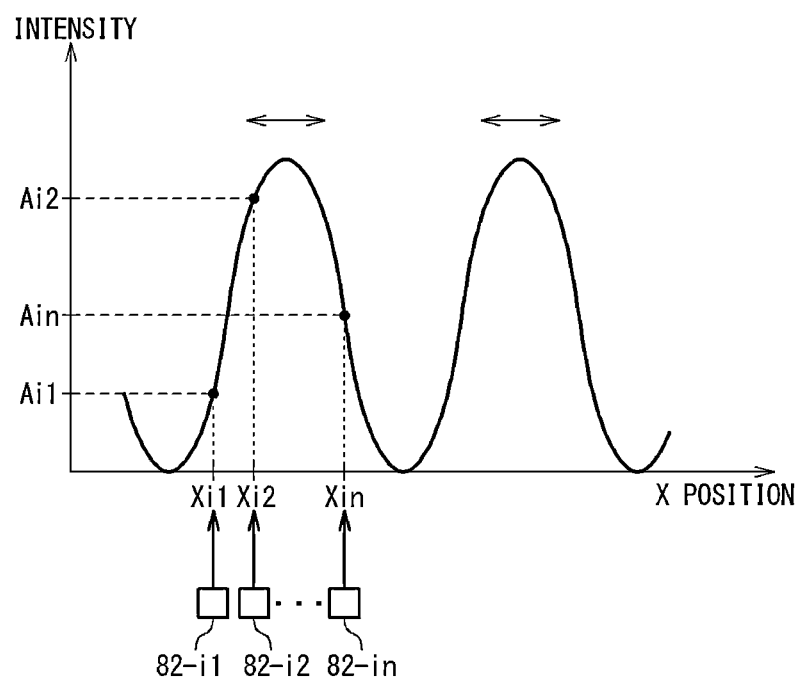
FIG. 8 is a conceptual diagram to explain a phase control in the embodiment of the present invention.

FIG. 8 conceptually shows the measurement of the intensity of the superposed laser beam Bs-i by the plurality of sensors 82-*ij*. Like FIG. 6 shown in the above description, the horizontal axis shows a position to the X direction, and the vertical axis shows laser intensity. As shown in FIG. 8, the sensor 82-ij measures the intensity Aij of the superposed laser beam Bs-i in the position Xij. In other words, the intensities Ai1 to Ain of the superposed laser beam Bs-i in the plurality of positions Xi1 to Xin are obtained. The intensities Ai1 to Ain in such a plurality of positions Xi1 to Xin represent the spatial interference pattern (an intensity distribution) of the superposed laser beam Bs-i. Therefore, the intensities Ai1 to Ain observed in the plurality of positions Xi1 to Xin are used as interference pattern data PTNi of the superposed laser beam Bs-i.

Here, an "interference pattern parameter Ri" is introduced. The interference pattern parameter Ri is defined based on the intensities Ai1 to Ain which are observed in the plurality of positions Xi1 to Xin and is represented as Ri=f(Xij, Aij). In the simplest case, only two sensors 82-i1 and 82-i2 are used and the interference pattern parameter Ri is defined based on the intensities Ai1 and Ai2 in the two positions Xi1 and Xi2. For example, the interference pattern parameter Ri depends on an intensity ratio between two points: Ri=f1(Ai2/Ai1). Or, the interference pattern parameter Ri depends on the inclination between two points: Ri=f2((Ai2−Ai1)/(Xi2−Xi1)). Or, the interference pattern parameter Ri depends on the intensity difference between two points: Ri=f3(Ai2−Ai1).

It is possible to say that such an interference pattern parameter Ri represents the spatial interference pattern (the intensity distribution) of the superposed laser beam Bs-i. When the phase of the phase-shifted laser beam Bc-i changes, the interference pattern parameter Ri also changes. In other words, the interference pattern parameter Ri can be changed by controlling the phase shift in the above-mentioned phase shifting section 50 to change the phase of phase-shifted laser beam Bc-i.

The phase control section 90 can acquire the interference pattern parameters R1, R2 and R3 related to the superposed laser beams Bs-1, Bs-2 and Bs-3 from the interference pattern data PTN1, PTN2 and PTN3. By referring to those interference pattern parameters R1, R2 and R3, the phase control section 90 can get the phase relation between the plurality of phase-shifted laser beams Bc-1, Bc-2 and Bc-3. Therefore, the phase control section 90 can carry out the feedback control to the phase shifters 51-1 to 51-3 of the phase shifting section 50 in order to obtain the desired phase relation.

Typically, the phase control section 90 carries out the feedback control so that the phases of the phase-shifted laser beams Bc-1 to Bc-3 become coincident with each other. Specifically, target values Rt1, Rt2 and Rt3 are set. The phase control section 90 carries out the feedback control for the phase shift of the phase shifting section 50 such that the interference pattern parameters R1, R2 and R3 are coincident with the target values Rt1, Rt2 and Rt3. In other words, the phase control section 90 locks the phase of the phase-shifted laser beam Bc-i to the desired value by controlling the interference pattern parameter Ri to the target value Rti.

The target values Rt1, Rt2 and Rt3 may be previously set to circuits such as registers. The target values Rt1, Rt2 and Rt3 may be set by an external signal. The target values Rt1, Rt2 and Rt3 may be a common value. The target values Rt1, Rt2 and Rt3 may be selectable from among a plurality of values. The target values Rt1, Rt2 and Rt3 may be variable continuously.

Note that the sensor 82-ij may be designed to be movable to the X direction. By moving the sensor 82-ij physically in the X direction, the locked value of the phase of the phase-shifted laser beam Bc-i can be changed. Or, the locked value may be changed by processing the interference pattern data and outputting the processed result. For example, by adjusting the internal resistance of the sensor 82 or a bias voltage and so on, the output voltage of the sensor 82 can be changed and thus, the locked value can be changed.

Figure 9:
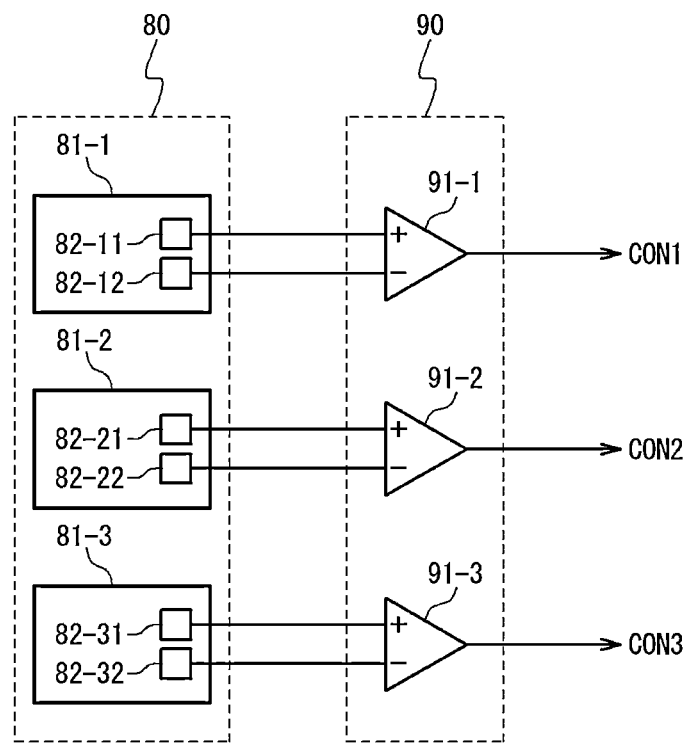
FIG. 9 is a diagram showing a configuration example of the observing section and the phase control section in the embodiment of the present invention.

FIG. 9 shows an example of the configuration of the observing section 80 and the phase control section 90. Each observing unit 81-i includes only two sensors 82-i1 and 82-i2 and measures two intensities Ai1 and Ai2 of the superposed laser beam Bs-i. In other words, the interference pattern data PTNi is the intensities Ai1 and Ai2. Because the number of sensors 82 is the smallest, the configuration is simple and is suitable.

The phase control section 90 includes a differential amplifier 91-i connected with the observing unit 81-i. The differential amplifier 91-i generates the control signal CONi based on the interference pattern data PTNi. Specifically, two signals are outputted from the sensors 82-i1 and 82-i2 according to the observation intensities Ai1 and Ai2 and those two signals are supplied to the two input terminals of the differential amplifier 91-i. The differential amplifier 91-i generates the control signal CONi so that an intensity difference Ri=Ai2−Ai1 is made identical with the predetermined target value RTi.

Figure 10:
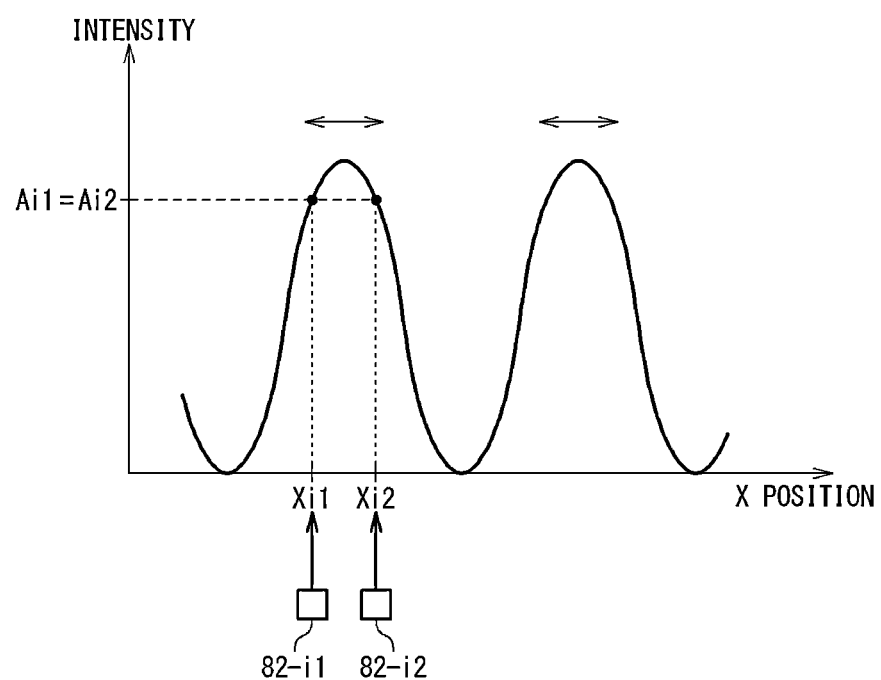
FIG. 10 is a conceptual diagram to explain the phase control in an embodiment of the present invention.

For example, the predetermined target value Rti is set to "0". This is equivalent to carrying out the feedback control so that the two intensities Ai1 and Ai2 are identical with each other, as shown in FIG. 10. In other words, the differential amplifier 91-i carries out the feedback control of the control signal CONi (phase shifter 51-i) so that the intensities Ai1 and Ai2 become equal. The control shown in FIG. 10 is simple and is desirable.

Also, in case of the control shown in FIG. 10, when the intensities Ai1 and Ai2 are coincident with each other, a peak of the intensity distribution (or valley thereof) comes to a halfway point of positions Xi1 and Xi2. Therefore, the reliable phase control becomes possible even if "absolute values of the peak intensities" are different among the superposed laser beams Bs-1 to Bs-3.

Note that it is possible to set a halfway point between the positions Xi1 and Xi2 to a middle point between the maximal value and the minimal value in the intensity distribution, by adjusting the sensor positions or the intensity distribution. For example, an interval of the positions Xi1 and Xi2 is set to a half of a period of intensity pattern change. Thus, preferably, the sensitivity can be made the highest to the change of the intensity distribution due to the change of the phase.

As described above, according to the present embodiment, the phase control is carried out based on "the spatial interference pattern". Because it is not a heterodyne method, a frequency shifter is unnecessary. That is, it becomes possible to realize the phase control with the configuration simpler than the conventional technique. This leads to the reduction of the cost.

Also, by combining the plurality of phase-shifted laser beams Bc-1, Bc-2 and Bc-3 after the amplification, it is possible to obtain a high intensity laser output. Also, as an example of the coherent combination, it is exemplified that a control is executed to eliminate or remove the phase difference among the phase-shifted laser beams Bc-1, Bc-2 and Bc-3 at the output stage. The present embodiment is possible to apply to a coherent beam combining apparatus and a high output laser system.

The embodiments of the present invention have been described with reference to the attached drawings. However, the present invention is not limited to the above-mentioned embodiments and can be appropriately modified by a person skilled in the art in the range which does not deviate from the features of the present invention The present application claims a priority based on Japan patent Application No. JP 2012-009972 filed on Jan. 20, 2012. The disclosure thereof is incorporated herein by reference.

The invention claimed is:

1. A multi-beam combining apparatus comprising:
    a phase shifting section configured to generate a plurality of phase-shifted laser beams by shifting a phase of each of a plurality of laser beams;
    a superposing section configured to generate a plurality of superposed laser beams by superposing a reference laser beam and each of the plurality of phase-shifted laser beams;
    an observing section configured to generate interference pattern data of a spatial interference pattern when observing each of the plurality of superposed laser beams; and
    a phase control section configured to carry out a feedback control of the phase shift in said phase shifting section based on the interference pattern data obtained from each of the plurality of superposed laser beams, and set each of the plurality of phase-shifted laser beams to a desired state,
    wherein said observing section comprises a plurality of observing units disposed respectively to observe the plurality of superposed laser beams,
    wherein each of said plurality of observing units comprises a plurality of sensors configured to observe an intensity of a corresponding one of the plurality of superposed laser beams in a plurality of observation positions, and
    wherein the interference pattern data contains the intensity observed in each of the plurality of observation positions.

2. The multi-beam combining apparatus according to claim 1, wherein an interference pattern parameter is defined based on the intensity observed in each of the plurality of observation positions,
    wherein said phase control section carries out the feedback control of the phase shift in said phase shifting section such that the interference pattern parameter of each of the plurality of superposed laser beams coincides with a target value.

3. The multi-beam combining apparatus according to claim 2, wherein said plurality of sensors are two sensors,
wherein said two sensors observe the intensity of the corresponding superposed laser beam in two observation positions, and
wherein the interference pattern parameter depends on a ratio of the two observed intensities, an inclination between the two observed intensities, or a difference between the two observed intensities.

4. The multi-beam combining apparatus according to claim 3, wherein said phase control section carries out the feedback control such that the two observed intensities in the two observation positions are equal to each other or are equal to predetermined values.

5. The multi-beam combining apparatus according to claim 1, further comprising:
a beam amplifying section configured to amplify each of the plurality of phase-shifted laser beams.

6. The multi-beam combining apparatus according to claim 1, further comprising:
a laser oscillator configured to generate a master laser beam; and
a beam splitting section configured to split the master laser beam into the plurality of laser beams and the reference laser beam.

7. The multi-beam combining apparatus according to claim 6, wherein the reference laser beam generated by the beam splitting section reaches said superposing section without passing a frequency shifter.

* * * * *